(12) United States Patent
May

(10) Patent No.: US 10,381,863 B2
(45) Date of Patent: Aug. 13, 2019

(54) ENERGY STORAGE DEVICE FOR A PHOTOVOLTAIC SYSTEM, AND METHOD FOR OPERATING AN ENERGY STORAGE DEVICE OF A PHOTOVOLTAIC SYSTEM

(71) Applicant: Robert Bosch GmbH, Stuttgart (DE)

(72) Inventor: Johanna May, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 79 days.

(21) Appl. No.: 13/937,719

(22) Filed: Jul. 9, 2013

(65) Prior Publication Data
US 2014/0015471 A1 Jan. 16, 2014

(30) Foreign Application Priority Data

Jul. 13, 2012 (DE) .................. 10 2012 212 328

(51) Int. Cl.
| | |
|---|---|
| *H02J 7/00* | (2006.01) |
| *H01M 10/44* | (2006.01) |
| *H02J 50/00* | (2016.01) |
| *H02J 7/35* | (2006.01) |
| *H02J 50/30* | (2016.01) |
| *H02J 50/40* | (2016.01) |

(Continued)

(52) U.S. Cl.
CPC ............. *H02J 7/35* (2013.01); *H01M 10/441* (2013.01); *H01M 16/00* (2013.01); *H02J 7/0013* (2013.01); *H02J 50/30* (2016.02); *H02J 50/40* (2016.02); *H01M 10/052* (2013.01); *H01M 10/06* (2013.01); *H02J 3/32* (2013.01); *H02J 7/0075* (2013.01); *H02J 2007/0067* (2013.01); *Y02E 10/566* (2013.01); *Y02E 10/60* (2013.01); *Y02E 60/12* (2013.01); *Y02E 60/122* (2013.01); *Y02E 60/126* (2013.01); *Y02P 80/14* (2015.11)

(58) Field of Classification Search
CPC .... H01M 10/44; H01M 10/441; H01M 16/00; Y02E 10/60; Y02E 60/12; H02J 7/0075; H02J 7/35; H02J 50/30; H02J 50/40; H02J 7/0013
USPC .................... 320/127, 130, 131, 135; 307/66
See application file for complete search history.

(56) References Cited

U.S. PATENT DOCUMENTS

| | | | |
|---|---|---|---|
| 7,800,247 B2 * | 9/2010 | Chang et al. | 307/46 |
| 8,525,483 B2 * | 9/2013 | Danner | H02J 7/0004 320/138 |

(Continued)

FOREIGN PATENT DOCUMENTS

| | | |
|---|---|---|
| DE | 10 2010 019 268 | 11/2011 |
| EP | 2 254 218 | 11/2010 |
| EP | 2 475 070 | 7/2012 |

OTHER PUBLICATIONS

A. Goetzberger, "Seventh National Symposium Photovoltaic Solar Energy," Kloster Banz Staffelstein, Mar. 1992, 13 pages.

*Primary Examiner* — Stacy Whitmore
(74) *Attorney, Agent, or Firm* — Norton Rose Fulbright US LLP; Gerard Messina

(57) ABSTRACT

An energy storage device for a photovoltaic system includes: at least one first energy store which has a first cycle stability; at least one second energy store which has a second cycle stability, the first cycle stability being higher than the second cycle stability; and a control device which is designed to discharge the first energy store in a first operating mode and to discharge the second energy store in a second operating mode.

12 Claims, 4 Drawing Sheets

(51) Int. Cl.
*H01M 16/00* (2006.01)
*H01M 10/052* (2010.01)
*H01M 10/06* (2006.01)
*H02J 3/32* (2006.01)

(56) References Cited

U.S. PATENT DOCUMENTS

| | | | | |
|---|---|---|---|---|
| 8,698,448 B2* | 4/2014 | Dong | | H02J 7/0003 |
| | | | | 320/101 |
| 9,337,655 B2* | 5/2016 | Reifenhauser | | H02J 3/00 |
| 2004/0174142 A1* | 9/2004 | Olson | | H02J 7/0013 |
| | | | | 320/135 |
| 2007/0046257 A1* | 3/2007 | Inoue | | H01R 31/06 |
| | | | | 320/111 |
| 2009/0302681 A1* | 12/2009 | Yamada et al. | | 307/46 |
| 2010/0237985 A1* | 9/2010 | Landau-Holdsworth | | |
| | | | | B60L 3/0069 |
| | | | | 340/5.8 |
| 2010/0308765 A1* | 12/2010 | Moore | | H02J 7/0013 |
| | | | | 320/103 |
| 2011/0193518 A1* | 8/2011 | Wright et al. | | 320/101 |
| 2011/0267007 A1* | 11/2011 | Chen | | H01M 10/441 |
| | | | | 320/126 |
| 2012/0025614 A1 | 2/2012 | Taimela et al. | | |
| 2012/0231308 A1* | 9/2012 | Chiang | | C01B 25/45 |
| | | | | 429/90 |
| 2012/0268076 A1* | 10/2012 | Danner | | H02J 7/0055 |
| | | | | 320/138 |
| 2012/0293002 A1* | 11/2012 | Ye | | H02J 9/06 |
| | | | | 307/66 |
| 2012/0293113 A1* | 11/2012 | Fischer | | H01R 13/6675 |
| | | | | 320/107 |
| 2013/0099721 A1* | 4/2013 | Azzam et al. | | 320/101 |
| 2013/0207475 A1* | 8/2013 | Dong | | H02J 9/06 |
| | | | | 307/80 |
| 2013/0211616 A1* | 8/2013 | Moore | | H02J 7/0013 |
| | | | | 700/295 |
| 2013/0300368 A1* | 11/2013 | Navid | | H01R 31/06 |
| | | | | 320/115 |
| 2014/0117941 A1* | 5/2014 | Knaggs | | H02J 9/061 |
| | | | | 320/135 |
| 2014/0253013 A1* | 9/2014 | Ishibashi | | H02J 3/14 |
| | | | | 320/101 |
| 2016/0176307 A1* | 6/2016 | Becker | | B60L 11/1816 |
| | | | | 320/109 |
| 2017/0237280 A1* | 8/2017 | Baarman | | H02J 7/0027 |
| | | | | 320/108 |

* cited by examiner

ENERGY STORAGE DEVICE FOR A PHOTOVOLTAIC SYSTEM, AND METHOD FOR OPERATING AN ENERGY STORAGE DEVICE OF A PHOTOVOLTAIC SYSTEM

BACKGROUND OF THE INVENTION

1. Field of the Invention

The present invention relates to an energy storage device, e.g., for a photovoltaic system, a control device, and a method for operating an energy storage device.

2. Description of the Related Art

In an energy storage device for photovoltaic systems, the same type of batteries, for example multiple structurally identical lead gel accumulators or multiple structurally identical lithium-ion accumulators of the same type, are typically used.

The requirements for the energy stores of the energy storage device, such as the cycle stability and calendar service life, are crucial for the cost of the energy storage device. For example, an energy store of an energy storage device in a photovoltaic system must tolerate a fairly long period of a high state of charge in the summer, and of a low state of charge in the winter. In addition, consumption-related microcycles influence the service life of the energy stores. The higher the cycle stability and the longer the calendar service life, the higher the cost of the energy stores.

Published German patent application document DE 10 2010 019 268 A1 describes a device in which the battery bank is formed by a plurality of batteries or battery groups connected in series. A predetermined number of the batteries or battery groups electrically situated at the positive side of the photovoltaic system are each provided with a tap or tapping terminal. One of the taps is selected according to the level of a desired discharge current, and is connected to the positive input terminal of the inverter via an isolating switch.

BRIEF SUMMARY OF THE INVENTION

According to the present invention, an energy storage device for a photovoltaic system is provided, having at least one first energy store which has a first cycle stability, at least one second energy store which has a second cycle stability, the first cycle stability being higher than the second cycle stability, and having a control device which is designed to discharge the first energy store in a first operating mode and to discharge the second energy store in a second operating mode.

In addition, a method for operating an energy storage device of a photovoltaic system is provided, the energy storage device having a first energy store which has a first cycle stability and a second energy store which has a second cycle stability, the first cycle stability being higher than the second cycle stability, having the following method steps: establishing a first operating mode or a second operating mode; discharging the first energy store in the first operating mode; and discharging the second energy store in the second operating mode.

The finding on which the present invention is based is to use multiple energy stores having different cycle stabilities in an energy storage device, and to operate according to predetermined operating modes. Costs may be saved in this way, since the energy stores may be operated according to their advantages. The first energy store is operated "normally" in the first operating mode. This means that the first energy store stores energy generated by the photovoltaic system, and delivers this energy to consumers as needed. This means that the first energy store takes part in all microcycles. Thus, in the first operating mode the first energy store is charged by the photovoltaic system, and is discharged by the consumers coupled to the photovoltaic system. In addition, energy may be fed into the public power grid.

In the second operating mode the second energy store, which has a lower cycle stability, is used and discharged. For example, the second energy store is discharged when the photovoltaic system is not able to produce current and/or if the public power grid has failed. In addition, the second operating mode may be an operating mode in which the first energy store has reached a low state of charge and should not be further discharged.

Due to the different cycle stabilities of the first energy store and of the second energy store, the costs for the energy storage device may be drastically lowered. In addition, the use of two different energy stores results in an increase in operating reliability since a reserve energy store is provided.

The cycle stability is understood to mean the information concerning how often an energy store may be discharged and subsequently recharged until its capacity falls below a certain value.

Advantageous specific embodiments and refinements result from the subclaims, and from the description with reference to the figures.

In one specific embodiment, the first operating mode is an operating mode in which the first energy store and the second energy store are chargeable by the photovoltaic system. For example, the first energy store and the second energy store are charged in the first operating mode, in the first operating mode only the first energy store having the higher cycle stability being discharged. The second energy store having the lower cycle stability is then maintained at a high state of charge and is not discharged. The first energy store is thus used for internal consumption. The energy storage device may thus be operated in a very efficient and cost-saving manner.

In another specific embodiment, the second operating mode is an operating mode in which the first energy store and the second energy store are not chargeable by the photovoltaic system. For example, the second operating mode is characterized in that the photovoltaic system generates no energy, and the first energy store and the second energy store are not chargeable. In particular this specific embodiment results in a cost benefit, since for a state of the photovoltaic system in which no energy is generated it is not necessary to purchase electrical power from the public power grid.

In another specific embodiment, the second operating mode is an operating mode in which the first energy store has a low state of charge. A low state of charge is defined, for example, as a state of charge in which the state of charge is, for example, 30% or less of the nominal capacity of the energy store. If the first energy store has reached the low state of charge, only the second energy store is discharged. The service life of the energy storage device may be increased in this way.

In another specific embodiment, the second operating mode is an operating mode in which there is an increased energy demand by consumers coupled to the first energy store and to the second energy store. For example, the control device detects that a very large number of consumers is requesting or will request energy from the first energy store, so that the first energy store must provide a very high discharge current. The control device then switches on the second energy store, so that the second energy store also supplies energy to the plurality of consumers. The service life of the energy storage device may be significantly prolonged in this embodiment as well.

In another specific embodiment, the first energy store and the second energy store are designed as electrical accumulators of the same type.

In another specific embodiment, the first energy store and the second energy store are designed as lead accumulators or as lithium-ion accumulators. The first and the second energy store may also be designed, for example, as a Li-ion/lithium-cobalt dioxide accumulator, a lithium polymer accumulator, a lithium-manganese accumulator, a lithium-iron phosphate accumulator, a lithium-iron-yttrium phosphate accumulator, a lithium titanate accumulator, a lithium-sulfur accumulator, a lithium metal-polymer accumulator, a sodium-nickel chloride high-temperature battery, a sodium-sulfur accumulator, a nickel-cadmium accumulator, a nickel-iron accumulator, a nickel-hydrogen accumulator, a nickel-metal hydride accumulator, a nickel-zinc accumulator, a lead accumulator, a silver-zinc accumulator, a vanadium redox accumulator, and/or a zinc-bromine accumulator. In addition, the first energy store and the second energy store may be designed as a flywheel, a capacitor, or a supraconducting coil, and/or as a compressed air store.

In another specific embodiment, the first energy store has a higher discharge current than the second energy store. Also in this way, the energy stores may be used in a particularly functionally correct manner, resulting in cost savings here as well.

In another specific embodiment, the first and the second energy stores are designed as lead accumulators, the second energy store in the first operating mode being charged to a high state of charge, for example to greater than 80%, in particular to greater than 90%, of its nominal capacity.

In another specific embodiment, the first energy store and the second energy store are designed as lithium-ion accumulators, the second energy store in the first operating mode being charged to a medium state of charge, for example to 50%-70% of its nominal capacity.

The above-mentioned embodiments and refinements may be arbitrarily combined with one another if this is meaningful. Further possible embodiments, refinements, and implementations of the present invention also include combinations, not explicitly mentioned, of features of the present invention described above or below with regard to the exemplary embodiments. In particular, those skilled in the art will also add individual aspects as improvements or supplements to the particular basic form of the present invention.

DETAILED DESCRIPTION OF THE INVENTION

Figure 1:
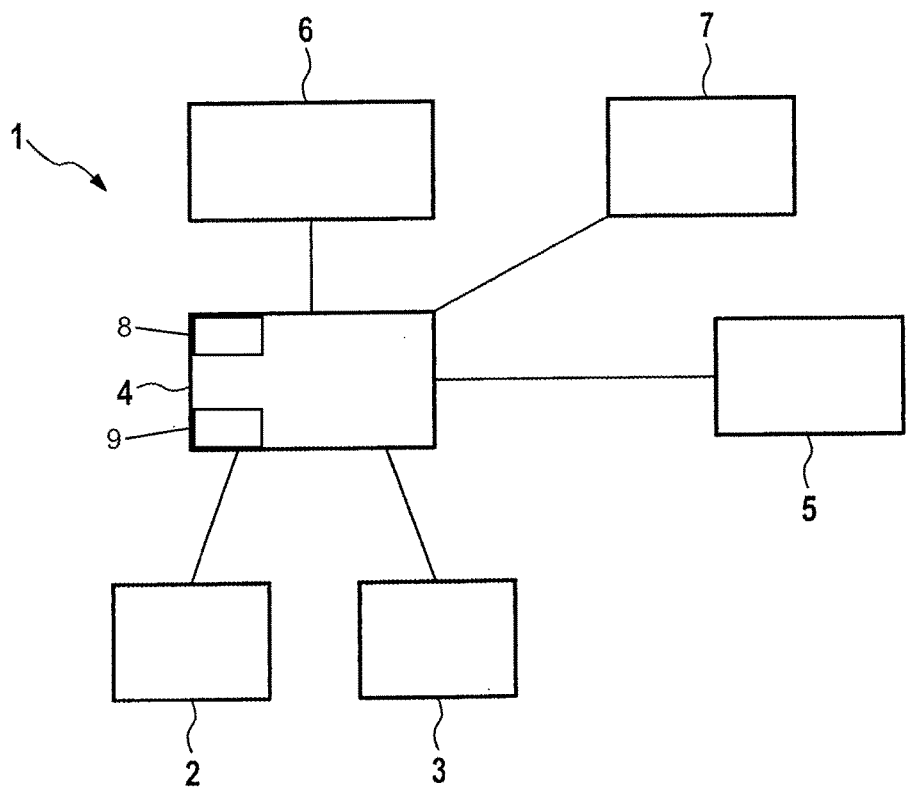
FIG. 1 shows a schematic block diagram of an energy storage device according to a first specific embodiment of the present invention.

Unless stated otherwise, identical or functionally equivalent elements and devices are provided with the same reference numerals in all of the figures.

FIG. 1 shows a schematic block diagram of an energy storage device 1 according to a first specific embodiment of the present invention. Energy storage device 1 has a first energy store 2 which has a first cycle stability, and a second energy store 3 which has a second cycle stability. The first cycle stability of first energy store 2 is higher than the cycle stability of second energy store 3. Energy stores 2 and 3 may be designed as lead accumulators or as lithium-ion accumulators, for example.

First energy store 2 and second energy store 3 are electrically coupled to a control device 4. The control device preferably has a separate connection for energy stores having a high cycle stability, and a separate connection for energy stores having a low cycle stability. This connection may, for example, be designed in such a way that for a correct connection, only a plug which corresponds to the connection fits into the connection, for example due to a certain shape. In addition to having a control element 8, control device 4 has a human-machine interface 9 which is designed for inputting user data for establishing the first and/or the second operating mode, described below.

In addition, a system 6 which recovers energy from regenerative sources is coupled to control device 4. For example, a photovoltaic system 6 which generates electrical current from solar energy is coupled to control device 4. In addition, electrical consumers 5 which consume electrical power are coupled to control device 4. Photovoltaic system 6 generates electrical current which may be delivered directly to electrical consumers 5, and/or used for charging first energy store 2 and/or second energy store 3. In addition, control device 4 is coupled to a public power grid 7.

Figure 2:
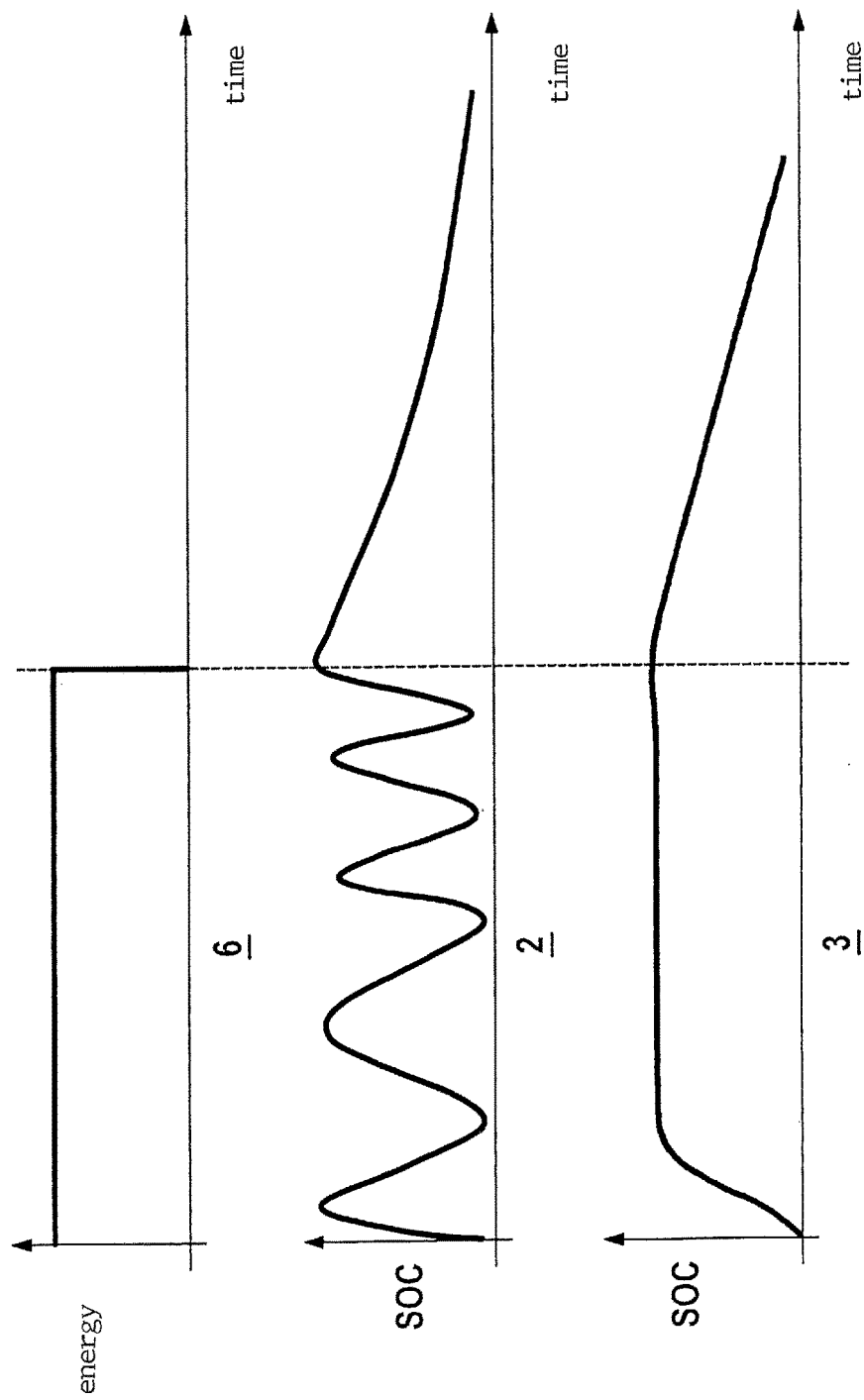
FIG. 2 shows a schematic power diagram as a function of time of a first energy store and of a second energy store according to one specific embodiment of the present invention.

FIG. 2 shows a schematic power diagram as a function of time of a first energy store 2 and of a second energy store 3 according to one specific embodiment of the present invention. In addition, a power diagram of a photovoltaic system 6 is shown for illustrating the mode of operation of energy storage device 1.

The power diagram of the photovoltaic system is illustrated at the top, the vertical axis representing the power of the photovoltaic system and the horizontal axis representing time.

The power diagram of first energy store 2 is illustrated in the middle of FIG. 2, and the power diagram of second energy store 3 is illustrated at the bottom of FIG. 2. The vertical axis of the power diagrams of the energy stores represents the state of charge (SOC) of the energy stores.

It is apparent that first energy store 2 is charged and discharged while photovoltaic system 6 is generating current. For example, first energy store 2 is discharged by consumers 5 which are directly coupled to control device 4. This consumption is also referred to as internal consumption. It is also possible for the first energy store to feed energy into a public power grid 7.

It is also apparent that second energy store 3 is charged while photovoltaic system 6 is generating current. However, second energy store 3 is not discharged. This state is, for example, the first operating mode, in which only first energy store 2 is discharged.

Beginning at the point in time at which photovoltaic system 6 no longer generates current, since, for example, the sun is no longer shining or the weather conditions do not allow this, first energy store 2 and/or second energy store 3 is/are discharged.

Control device 4 recognizes with the aid of sensors that photovoltaic system 6 is no longer generating current, and then enables first energy store 2 and second energy store 3 so that they may be discharged. This state is the second operating mode, for example.

Figure 3:
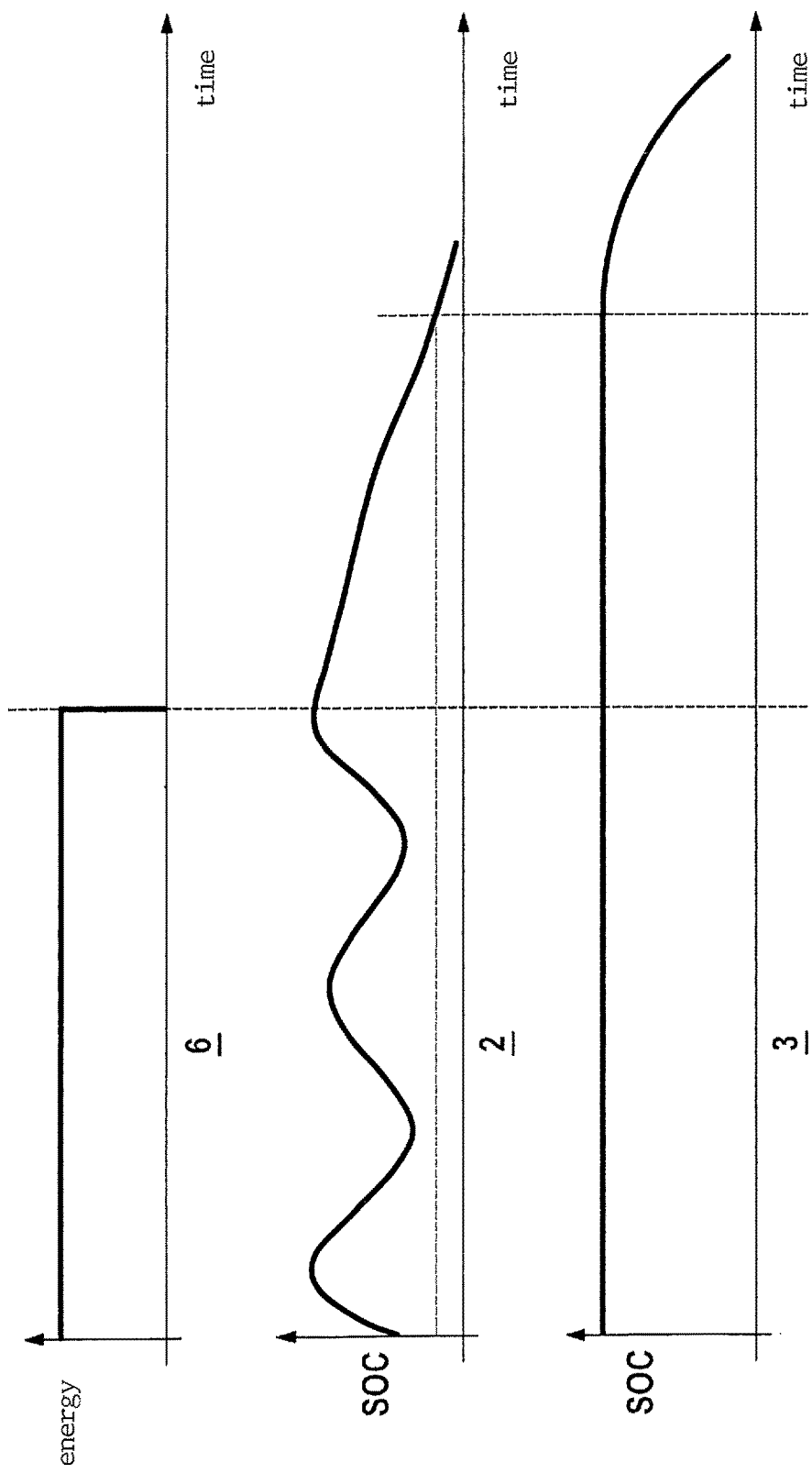
FIG. 3 shows a schematic power diagram as a function of time of a first energy store and of a second energy store according to one specific embodiment of the present invention.

FIG. 3 shows a schematic power diagram as a function of time of a first energy store 2 and of a second energy store 3 according to one specific embodiment of the present invention. The same as in FIG. 2, FIG. 3 illustrates a power diagram of a photovoltaic system at the top. It is apparent that first energy store 2 is charged and discharged. Second energy store 3 has already been fully charged, for example with energy from the photovoltaic system and/or a public power grid. First energy store 2 is discharged as soon as photovoltaic system 6 is no longer generating current.

When the state of charge of second energy store 3 reaches a predefined lower limiting value, second energy store 3 is enabled and discharged. The service life of energy storage device 1 may be significantly increased in this way. In addition, the installation costs may be kept low, since an energy store having a low cycle stability results in lower costs.

Figure 4:
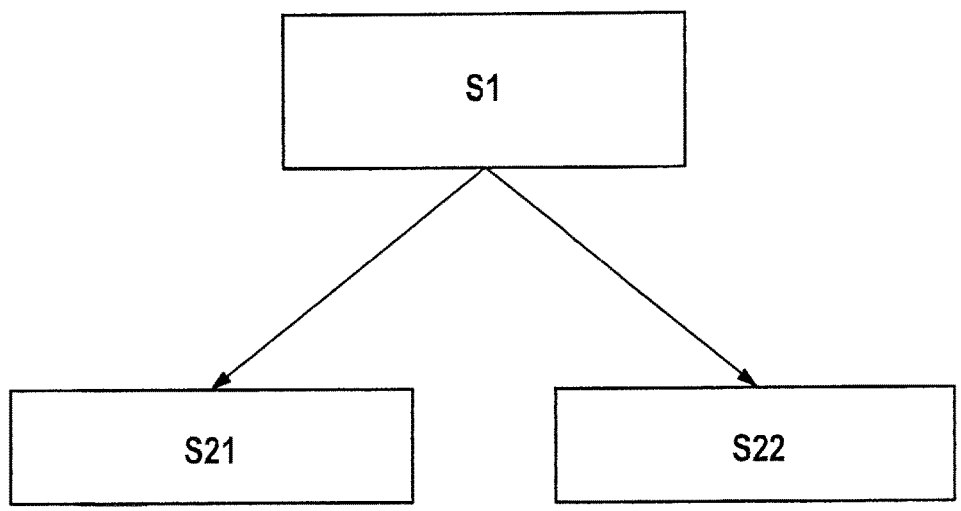
FIG. 4 shows a schematic flow chart of one specific embodiment of the method for operating an energy storage device.

FIG. 4 shows a schematic flow chart of one specific embodiment of a method for operating an energy storage device 1. It is established in step S1 whether the energy storage device should be operated in the first operating mode or in the second operating mode. Energy storage device 1 is then operated either in the first operating mode or in the second operating mode.

Although the present invention has been described above with reference to preferred exemplary embodiments, it is not limited thereto, and may be modified in numerous ways. In particular, the present invention may be changed or modified in various ways without departing from the core of the present invention.

What is claimed is:

1. An energy storage device for a photovoltaic system, comprising:
   at least one first energy store which has a first cycle stability;
   at least one second energy store which has a second cycle stability, wherein the first cycle stability is higher than the second cycle stability; and
   a control device configured to discharge the first energy store in a first operating mode and to discharge the second energy store in a second operating mode, wherein the control device has a first connection for the first energy store and a second connection for the second energy store, the first connection and the second connection being separate from one another, wherein the control device is coupled to the first and second energy stores in order to enable electrical power from the first energy store and the second energy store to flow through the control device, wherein:
   the control device is directly coupled to electric consumers that consume electrical power,
   the control device is coupled to the photovoltaic system, the photovoltaic system generating electrical current from solar energy,
   the first energy store is configured as a lithium-iron phosphate accumulator,
   the second energy store is configured as a lead accumulator, and
   the second operating mode is an operating mode in which:
   the first energy store and the second energy store are not chargeable by the photovoltaic system on account of the photovoltaic system having ceased to generate the electrical current,
   a delay occurs between a time at which the photovoltaic system ceases to generate the electrical current and a time at which the second energy store begins to be discharged from a fully charged state,
   during the delay the first energy store is discharged until a time at which a state of charge of the first energy store is discharged to a predefined lower limiting value, and
   the time at which the state of charge of the first energy store is discharged to the predefined lower limiting value coincides with the time at which the second energy store begins to be discharged from a fully charged state.

2. The energy storage device as recited in claim 1, wherein the first operating mode is an operating mode in which the first energy store and the second energy store are chargeable by the photovoltaic system.

3. The energy storage device as recited in claim 1, wherein the second operating mode is an operating mode in which the first energy store has a low state of charge.

4. The energy storage device as recited in claim 1, wherein the second operating mode is an operating mode in which there is an increased energy demand by consumers coupled to the first energy store and to the second energy store.

5. The energy storage device as recited in claim 1, wherein the first energy store and the second energy store are configured as electrical accumulators of the same type.

6. The energy storage device as recited in claim 1, wherein the control device is designed in such a way that for a correct connection, only a plug which corresponds to the connection fits into the connection.

7. The energy storage device as recited in claim 6, wherein the plug fits into the connection due to a shape of the plug fitting into the connection.

8. A control device for an energy storage device, wherein the energy storage device includes at least one first energy store which has a first cycle stability and at least one second energy store which has a second cycle stability, the first cycle stability being higher than the second cycle stability, the control device comprising:
   a first connection for connecting to the at least one first energy store which has the first cycle stability;
   a second connection for connecting to the at least one second energy store which has the second cycle stability; and
   a control element configured to discharge the first energy store in a first operating mode and to discharge the second energy store in a second operating mode, wherein the control element connects to the first energy store via the first connection and connects to the second energy store via the second connection, the first connection and the second connection being separate from one another, wherein the control device is coupled to the first and second energy stores in order to enable electrical power from the first energy store and the second energy store to flow through the control device, wherein:
   the control device is directly coupled to electric consumers that consume electrical power, the control device is coupled to a photovoltaic system that generates electrical current from solar energy, the first energy store is configured as a lithium-iron phosphate accumulator, the second energy store is configured as a lead accumulator, and the second operating mode is an operating mode in which:

the first energy store and the second energy store are not chargeable by the photovoltaic system on account of the photovoltaic system having ceased to generate the electrical current, a delay occurs between a time at which the photovoltaic system ceases to generate the electrical current and a time at which the second energy store begins to be discharged from a fully charged state, during the delay the first energy store is discharged until a time at which a state of charge of the first energy store is discharged to a predefined lower limiting value, and the time at which the state of charge of the first energy store is discharged to the predefined lower limiting value coincides with the time at which the second energy store begins to be discharged from a fully charged state.

9. The control device as recited in claim 8, further comprising:

a human-machine interface configured to enable a user to input user data for establishing at least one of the first and second operating modes.

10. A method for operating an energy storage device of a photovoltaic system, the energy storage device having a first energy store which has a first cycle stability and a second energy store which has a second cycle stability, the first cycle stability being higher than the second cycle stability, the method comprising:

selectively establishing one of a first operating mode or a second operating mode;

discharging the first energy store in the first operating mode; and discharging the second energy store in the second operating mode, wherein a control device has a first connection for the first energy store and a second connection for the second energy store, the first connection and the second connection being separate from one another, wherein the control device is coupled to the first and second energy stores in order to enable electrical power from the first energy store and the second energy store to flow through the control device, wherein:

the control device is directly coupled to electric consumers that consume electrical power, the control device is coupled to the photovoltaic system, the photovoltaic system generating electrical current from solar energy, the first energy store is configured as a lithium-iron phosphate accumulator, the second energy store is configured as a lead accumulator, and the second operating mode is an operating mode in which:

the first energy store and the second energy store are not chargeable by the photovoltaic system on account of the photovoltaic system having ceased to generate the electrical current, a delay occurs between a time at which the photovoltaic system ceases to generate the electrical current and a time at which the second energy store begins to be discharged from a fully charged state, during the delay the first energy store is discharged until a time at which a state of charge of the first energy store is discharged to a predefined lower limiting value, and the time at which the state of charge of the first energy store is discharged to the predefined lower limiting value coincides with the time at which the second energy store begins to be discharged from a fully charged state.

11. The method as recited in claim 10, wherein the second energy store in the first operating mode is charged to a state of charge greater than 80% of nominal capacity of the second energy store.

12. The method as recited in claim 10, wherein the second energy store in the first operating mode is charged to a state of charge in the range of 50%-70% of nominal capacity of the second energy store.

* * * * *